United States Patent
Bergmann

(10) Patent No.: US 11,738,476 B2
(45) Date of Patent: Aug. 29, 2023

(54) MAGAZINE TURRET ATTACHMENT FOR A PORTIONING MACHINE

(71) Applicant: POLY-CLIP SYSTEM GMBH & CO. KG, Hattersheim (DE)

(72) Inventor: Martin Bergmann, Hösbach (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 239 days.

(21) Appl. No.: 17/416,327

(22) PCT Filed: Dec. 18, 2019

(86) PCT No.: PCT/EP2019/086078
§ 371 (c)(1),
(2) Date: Jun. 18, 2021

(87) PCT Pub. No.: WO2020/127572
PCT Pub. Date: Jun. 25, 2020

(65) Prior Publication Data
US 2022/0072729 A1 Mar. 10, 2022

(30) Foreign Application Priority Data
Dec. 19, 2018 (DE) .......................... 102018132899.0

(51) Int. Cl.
*B26D 7/06* (2006.01)
*B26D 1/147* (2006.01)

(52) U.S. Cl.
CPC ........... *B26D 7/0641* (2013.01); *B26D 1/147* (2013.01); *B26D 7/0683* (2013.01); *B26D 2210/04* (2013.01)

(58) Field of Classification Search
CPC ...... B26D 7/0683; B26D 7/0641; B26D 7/06; B26D 1/147; B26D 2210/04
See application file for complete search history.

(56) References Cited

U.S. PATENT DOCUMENTS 3,587,689 A 6/1971 Bettcher
8,892,239 B2 * 11/2014 Weber .................. B26D 7/0683
700/109
(Continued)

FOREIGN PATENT DOCUMENTS

DE 19921047 A1 11/2000
DE 102010035657 A1 9/2011
(Continued)

OTHER PUBLICATIONS

Federal Service for Intellectual Property; Application No. 2021120790; Decision to Grant dated Apr. 12, 2022.
(Continued)

*Primary Examiner* — Sean M Michalski
(74) *Attorney, Agent, or Firm* — Fitch, Even, Tabin & Flannery LLP

(57) ABSTRACT

The present invention relates to a magazine turret attachment for a portioning machine for dividing a strand-like product into individual portions and a portioning machine having such a magazine turret attachment. The magazine turret attachment includes a turret base rotatable about a rotation axis which has at least one chute extending through the turret base and the chute axis of which extends at least approximately parallel to the rotation axis of the turret base; and at least one first chute module which may be reversibly arranged on the turret base in the area of the first chute and which is provided with only one chute extending through said first chute module and the chute axis of which extends coaxially to the chute axis of the first chute of the turret base and the cross-section of which corresponds at least approximately to the cross-section of the at least one chute of the turret base in order to form a first reception chute for a strand-like product.

15 Claims, 4 Drawing Sheets

(56) References Cited

U.S. PATENT DOCUMENTS

| | | | |
|---|---|---|---|
| 11,426,892 B2* | 8/2022 | Völkl | B26D 1/0006 |
| 2010/0116107 A1* | 5/2010 | Spillner | A22C 17/0033 |
| | | | 83/437.1 |
| 2011/0159162 A1* | 6/2011 | Schill | B26D 7/02 |
| | | | 83/100 |
| 2011/0226101 A1* | 9/2011 | Volkl | B26D 1/28 |
| | | | 83/176 |
| 2011/0265431 A1* | 11/2011 | Ramabadran | B26D 7/34 |
| | | | 53/513 |
| 2019/0313830 A1* | 10/2019 | Little | B26D 1/0006 |
| 2020/0276724 A1* | 9/2020 | Donaghy | B26D 3/26 |
| 2021/0169091 A1* | 6/2021 | Mayr | A22C 7/0046 |
| 2022/0072726 A1* | 3/2022 | Bergmann | B26D 7/0683 |

FOREIGN PATENT DOCUMENTS

| | | |
|---|---|---|
| EP | 1445078 B1 | 8/2006 |
| EP | 2366508 A2 | 9/2011 |
| EP | 2532493 B1 | 8/2016 |
| SU | 57371 A1 | 10/1940 |
| SU | 128320 A1 | 10/1960 |
| SU | 307274 A1 | 6/1971 |
| WO | 2006/123368 A1 | 11/2006 |

OTHER PUBLICATIONS

International Search Report for PCT/EP2019/086078, dated Mar. 10, 2020, and English Translation submitted herewith (5 pages).

* cited by examiner

MAGAZINE TURRET ATTACHMENT FOR A PORTIONING MACHINE

CROSS-REFERENCE TO RELATED APPLICATIONS

This application is a U.S. national phase application filed under 35 U.S.C. § 371 of International Application No. PCT/EP2019/086078, filed Dec. 18, 2019, designating the United States, which claims priority from German Application No. 10 2018 132 899.0, filed Dec. 19, 2018.

FIELD OF THE INVENTION

The present invention relates to a magazine turret attachment for a portioning machine for dividing a strand-like product into individual portions and a portioning machine having such a magazine turret attachment.

BACKGROUND

Portioning machines are used, for example, to cut strand-like foodstuff articles such as meat, fish, poultry or sausage products, or bakery products into slices of equal thickness and/or weight which are subsequently packaged as individual portions or packaged into portions containing several slices.

European Patent Application 2 532 493 discloses a portioning machine which serves for cutting weight-accurate portions from a strand-like cutting material such as a meat strand and which has a form tube turret containing several form tubes for receiving the cutting material, the axes of said form tubes being vertically oriented and having various different cross-sections. The form tube turret consists of several disc-shaped segments, such that the axial length of the form tubes may be varied by the addition or removal of segments.

A further portioning device for dividing a strand of foodstuff into portions having a predefined weight or a predefined thickness is known from EP-Patent 1 445 078. This device includes, among other things, a horizontally oriented drum and insertion chambers arranged laterally therein for receiving the strand of foodstuff that is to be divided.

The magazine turret attachments of these known portioning devices cannot be adapted to the length of the strand of foodstuff in so far as they are limited to only one integrally formed drum. If turret segments are used and the cross-section of the strand of foodstuff needs to be exchanged by a cross-section which is not covered by any of the form tubes of the mounted turret segments, all turret segments need to be removed and other turret segments need to be arranged instead, and possibly not all of the form tubes present in these new turret segments can be used in such cases. Apart from this, these turret segments are, in addition, heavy in weight.

It is therefore an object of the present invention to propose a magazine turret attachment and a portioning machine which may be adapted more rapidly, in an easier manner and with less expenditure of physical effort to the strand-like product to be processed.

SUMMARY OF THE INVENTION

According to the invention, a magazine turret attachment for a portioning machine for dividing a strand-like product into individual portions is proposed. The magazine turret attachment includes a turret base rotatable about a rotation axis and preferably at least approximately circular in shape which has at least one chute extending through the turret base and the chute axis of which extends at least approximately parallel to the rotation axis of the turret base, and at least one first chute module which may be reversibly arranged on the turret base in the area of the first chute and which is provided with only one chute extending through said first chute module and the chute axis of which extends coaxially to the chute axis of the first chute of the turret base and the cross-section of which corresponds at least approximately to the cross-section of the at least one chute of the turret base in order to form a first reception chute for a strand-like product. The chute or the cross-sectional shape of the chute may equally have any particular shape which may be adapted depending on the outer contour of the product to be received therein.

A configuration of this type makes it possible to provide a very compact chute module for forming a single reception chute for the strand-like product which may be handled easily and flexibly, since its weight is very light as compared to the turret segments known in the art.

The chute module may have any particular outer contour. It is advantageous if, on its side facing towards the outer circumference of the turret base, the chute module has a particular contour which corresponds to the circular contour of the turret base. It is further advantageous if this part-circular contour has the same radius as the turret base. The other sides of the chute module may preferably be formed by planar surfaces arranged at an angle of 90° relative to each other, thus simplifying the storage of the chute module.

Provision is made, for example, for the chute module to have a shape other than a rotationally symmetrical disc shape. Furthermore, provision may be made for the chute module to be positioned eccentrically with respect to the central axis or rotation axis of the turret base. The chute axis of the chute module may be arranged eccentrically with respect to the central axis or rotation axis. According to an exemplary embodiment, the chute module is columnar or pillar-like and/or extends parallel to the central axis or rotation axis of the turret base and upwards therefrom. The chute formed in the chute module is associated with only one respective chute of the turret base. This makes it possible to react in a flexible manner to changes in the cross-section of the strand of foodstuff in that only one single chute module needs to be exchanged. In case at least one further chute module is provided, which is equally associated with only one other chute in the turret base, the latter may remain unchanged. A further advantage of the chute modules according to the invention is the reduction in weight due to the nonrotationally symmetrical shape of the chute modules. Instead of having a cross-sectional shape essentially identical to that of the turret base, which has a round disc shape, the shape of the chute module, when considered in top view or in cross-section, is only a segment of said disc shape. This makes it possible to achieve considerable material savings as compared to a rotationally symmetrical disc shape. The magazine turret attachment according to the invention may therefore be adapted more rapidly, in an easier manner and with less expenditure of physical effort to the strand-like product to be processed. Due to the lighter weight, the handling of the chute modules, when they need to be exchanged for adapting to a change in the cross-section of the strand of foodstuff and/or for cleaning purposes, is greatly simplified.

According to a preferred configuration, the turret base has at least one second chute extending through the turret base and the chute axis of which extends at least approximately parallel to the rotation axis of the turret base. It is thus possible to form a further reception chute for the strand-like product on the turret base.

In a further preferred configuration, provision is made for a first chute module for forming a second reception chute for the strand-like product to be reversibly arrangeable on the turret base in the area of the second chute. It is thus possible to form two identical reception chutes for the strand-like product on the turret base.

Furthermore, it is advantageous if several first and second chutes or, optionally, further chutes are arranged in the turret base. Furthermore, provision may be made for the first chutes and the second chutes to be realised as pairs having identical cross-sections. In other words, the first chutes may have a first cross-sectional shape, whereas the second chutes have a second cross-sectional shape which is different from the first cross-sectional shape. Thus it is possible use one turret base in order to process strands of foodstuff having various different cross-sections. In addition, providing several identical chutes, such as providing pairs of identical chutes, makes it possible to simultaneously portion a strand-like product placed in one chute, while refilling the identical, empty chute at the same time.

If the turret base, in the area of the first chute, on its side which faces towards the first chute module when the first chute module is arranged on the turret base, has at least one first connecting portion, and if the at least one first chute module, on its side which faces towards the turret base when the first chute module is arranged on the turret base, has at least one first counter-connecting portion, the first connecting portion of the turret base and the first counter-connecting portion of the first chute module may enable a positive connection and/or a nonpositive connection of the chute module with the turret base for forming a reception chute for the essentially strand-like product.

In order to create a positive connection and/or a nonpositive connection, the first connecting portion of the turret base and the counter-connecting portion of the first chute module may be formed by complementary geometries.

In an advantageous configuration, the first connecting portion of the turret base is a recess extending circumferentially about the first chute of the turret base, whereas the first counter-connecting portion of the first chute module is a projection corresponding to the recess formed in the turret base and extending circumferentially about the chute of the first chute module.

It is further advantageous if the first chute module, on its side facing away from the turret base when the first chute module is arranged on the turret base, has at least one second connecting portion. The reception chute for the strand-like product may thus be adjustable in its length by superposing several first chute modules.

Obviously, the connecting portions may also be configured in another manner. One connecting portion may, for example, be formed by a drill hole which may be engaged by a matching bolt which forms the corresponding connecting portion. The length of the bolts may be adapted to the length of the superposed chute modules.

If the first connecting portion of the turret base and the second connecting portion of the first chute module are identically configured, the first chute modules may be placed above one another and above the turret base in any given order.

The chute modules provided for forming a reception chute may be of equal length. However, chute modules of different lengths may also be provided, thus enabling an even more precise length adjustment of the reception chute.

In a further preferred embodiment of the magazine turret attachment according to the invention, a second chute module is provided which may be reversibly arranged on the first chute module or on the turret base and which has a chute extending through the second chute module the chute axis of which extends coaxially to the chute axis of the first chute module and/or to the axes of the first or second chutes of the turret base and the cross-section of which at least approximately corresponds to the cross-section of the chute of the first chute module, the second chute module having a locking recess formed on its side facing away from the first chute module when the second chute module is arranged on the first chute module. A locking recess of this type makes it possible to fasten the reception chute for the strand-like product formed by the chute module on a suitable mount in order to stabilise the chute module in its position. A suitable mount may, for example, be formed by a shaft or similar object extending parallel to the chute module.

In an advantageous configuration, an essentially rod-shaped locking element is provided which has connecting portions formed on its ends and corresponding to the locking recesses of the second chute modules. It is thus possible, if two or more reception chutes are formed, to interconnect these by means of one or several locking elements or locking bolts.

According to the invention, provision may further be made for the turret base to have a base segment and a turret segment which are interconnected in such a manner that they may concurrently be rotatorily driven about their common central axis.

Further advantageously, provision may be made, in case the turret base is formed in two parts, for an essentially planar separating unit to be arranged between the base segment and the turret segment of the turret base. This makes it possible for a strand-like product inserted into the reception chute of the chute module of the magazine turret attachment to be positioned with precision.

The separating unit may be configured in various manners. However, it is advantageous if the essentially planar separating unit is an at least approximately circular metal sheet provided with at least one clearance arranged in the area of a chute portion of the turret base. A separating unit formed in this manner makes it possible to safely insert a strand-like product into a reception chute placed in a filling position and to transfer the strand-like product to a corresponding cutting position.

As mentioned above, the turret base may be a two-part configuration consisting of a base segment and turret segment connected thereto, which makes it possible to arrange a separating unit between these segments.

However, if such a separating unit within the magazine turret attachment is not required, it is obviously possible for the base segment and the turret segment of the turret base to be integrally formed as one single component.

Furthermore, according to the present invention, a portioning machine for dividing a preferably strand-like product into individual portions is proposed which comprises a magazine turret attachment according to the present invention and a portioning and cutting device arranged in the area of the turret base for separating an individual portion from the strand-like product prepared and held ready within the magazine turret attachment.

The portioning machine according to the invention offers all of the advantages explained in connection with the inventive magazine turret attachment.

Further according to the present invention and independently of the inventive embodiments explained further above, a magazine turret attachment to be used with a portioning machine for dividing a strand-like product into individual portions is proposed. The portioning machine includes a magazine turret attachment for the strand-like product, a pressing unit for pressure-compacting the strand-like product at least in its longitudinal direction, and a portioning and cutting device for portioning and separating individual portions from the strand-like product. The magazine turret attachment has a turret base including a base segment and a turret segment. The turret base and the turret segment have chute portions oriented coaxially with respect to one another for forming at least one reception chute for the strand-like product and are rotatably drivable about a common axis for positioning the reception chute in a cutting position. The pressing unit for pressure-compacting the strand-like product has at least one pressure ram and a counter-pressure element. The counter-pressure element is a slide element arranged between the base segment and the turret segment of the turret base which is reversibly movable in a direction at least approximately perpendicular to the rotation axis of the turret base between a release position and a closure position for unblocking or closing the reception chute placed in the cutting position.

The pressing unit, and in particular the slide element, may thus be preferably activated independently of the rotary drive mechanism of the turret unit. In addition, only slight modifications are required for the turret unit to be used together with the slide element.

In the simplest use case, the base segment of the turret base has a clearance corresponding to the slide element into which the slide element may be reversibly slid.

In order to achieve pressure-compacting of the strand-like product at least in a longitudinal direction preferably directly before the portioning or cutting operation, it is advantageous for the pressure ram of the pressing unit to be aligned coaxially with the reception chute when the latter is in the cutting position.

If the pressing unit comprises a planar separating element arranged between the base segment and the turret segment of the turret base which is arranged in a stationary manner with respect to a frame element of the portioning machine, this may, in addition, prevent the strand-like product from slipping through the turret unit when it is being filled into the turret unit. The planar separating element may be realised as a simple metal sheet, since it is not driven and serves merely for preventing the strand-like product from slipping through the chute.

It is further of advantage if the planar separating element has a clearance in the zone of the cutting position which is engaged by the slide element when the latter is in its closure position. Thus it is possible for the strand-like product, when it is in its cutting position, to be both pressure-compacted in its longitudinal direction and cut into individual portions. There is thus no need for driving the turret unit between the pressing operation and the cutting operation.

The clearance in the separating element may have any particular suitable shape, such as an oval or a polygon. It must simply be ensured that the reception chute for the strand-like product is kept unblocked when the latter is in the cutting position. In an advantageous configuration, the separating element has an approximately rectangular clearance, with the slide element having an approximately rectangular shape corresponding thereto. A rectangular shape, or a similar shape having at least parallel lateral edges, upon linear guiding of the slide element, ensures a reliable closure and a reliable unblocking of the reception chute when the latter is placed in the cutting position.

In order to ensure a more reliable guiding of the slide element, provision may be made in an advantageous configuration for the separating element to have guiding means for guiding the slide element during the reversible shifting movement for unblocking and closing the reception chute when it is in the cutting position. These may be guiding grooves in the separating element in which the slide element is guided.

In a further advantageous configuration, provision is made for the slide element to be connected to a linear drive for reversible movement between the release position and the closure position. A linear drive makes it possible to move the slide element along the shortest distance between the release position and the closure position, thus allowing to accelerate the portioning operation.

Basically, however, it is equally possible for the slide element to be connected to a pivot drive for reversible movement between the release position and the closure position, with the pivot axis, which is arranged parallel to the rotation axis of the turret base, is arranged outside of the turret base. Thereby the slide element will be moved by a pivotal movement between the release position and the closure position. Such pivotal movement might be derived from the rotatory movement of the cutter blade of the portioning and cutting device or of the turret unit, thus achieving a synchronisation of these movements. This solution may be provided as an alternative to the configuration of the linear movement of the separating element in a direction perpendicular to the rotation axis of the turret base as explained further above.

In a preferred embodiment of the portioning machine according to the invention, a transporting device for removing the individual portions that have been separated from the strand-like product may additionally be provided. The transporting device makes it possible to form individual portions and also groups of individual portions which may, for example, be transported to a packaging facility. According to a preferred embodiment, the transporting device may be formed by a transport belt.

For this purpose, the portioning machine according to the invention may have a control unit which may include, in addition to general control routines, specific control programmes permitting it, for example, to form predefined or freely selectable groups of individual portions by activating the transporting device correspondingly in a given manner.

The control unit may, for example, control the pressing operation in such a manner that only one pressing operation will be performed and that subsequently the compressed, strand-like product will be divided in its entirety into individual portions. However, it is also possible for the pressing operation to be controlled in such a manner that a new pressing operation will be performed after each separation of an individual portion from the strand-like product. Provision may be made, in this case, for the slide element to be moved into the closure position after each separation of an individual portion from the strand-like product, in view of a renewed pressure-compacting operation of the strand-like product.

Furthermore, according to the present invention, a method of controlling a portioning machine for dividing a preferably strand-like product into individual portions is proposed. The portioning machine comprises a reception unit for the strand-like product, a pressing unit for pressure-compacting the strand-like product at least in its longitudinal direction, and a portioning and cutting device for portioning and separating individual portions from the strand-like product.

The method includes the steps of:
inserting a strand-like product into a reception chute of the reception unit;
pressure-compacting the strand-like product at least in its longitudinal direction by displacing a pressure ram into the reception chute in the direction of a slide element of the pressing unit located in the closure position;
moving the slide element to a release position after the pressure-compacting operation has been accomplished;
displacing the pressure-compacted, strand-like product in the direction of the portioning and cutting device by means of the pressure ram of the pressing unit; and
separating individual portions from the pressure-compacted, strand-like product by the portioning and cutting device.

In accordance with the inventive method, the reception chute for inserting the strand-like product is placed in a reception position. In other words, a reception chute previously emptied at the cutting position is transferred to the reception position so that another strand-like product may be inserted therein.

In a subsequent step according to the inventive method, the reception chute is moved to a cutting position, once a strand-like product has been inserted therein.

According to the inventive method, the pressure-compacted, strand-like product is advanced portionwise by the pressure ram, once the pressure-compacting operation has been accomplished.

If the portioning machine has a transporting device for removing the individual portions separated from the strand-like product, the inventive method may comprise the additional step of controlledly driving said transporting device for creating individual portions or groups of individual portions.

By using the inventive method, all of the advantages explained in connection with the inventive portioning machine are realised.

DESCRIPTION OF THE DRAWINGS

An example embodiment of the magazine turret attachment according to the invention and of the equally inventive portioning machine will now be explained in connection with the following figures in the set of drawings. The terms "above", "below", "right", "left" refer to the corresponding orientation as illustrated in the respective figure in the set of drawings.

In the drawings.

DETAILED DESCRIPTION

Figure 1:
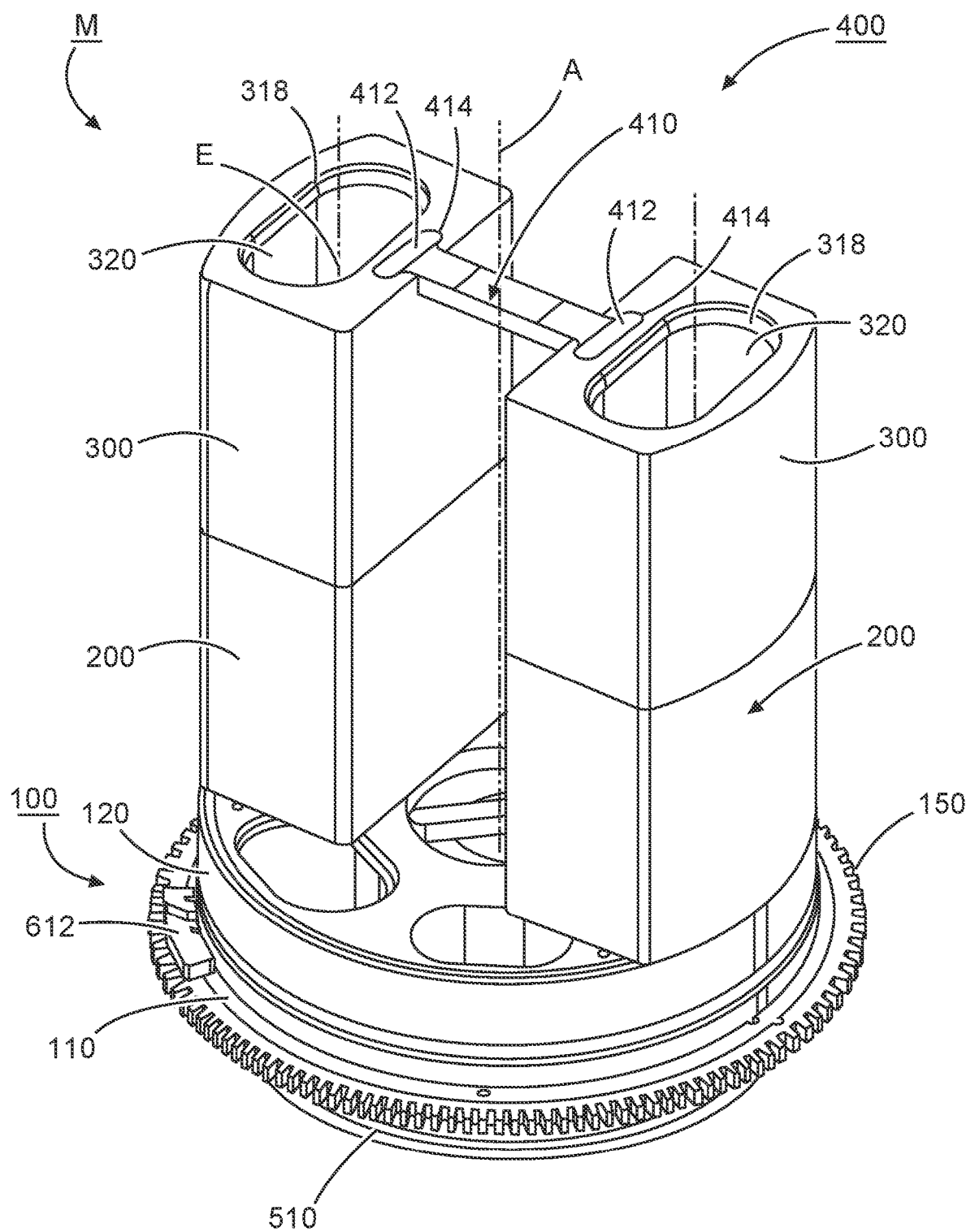
FIG. 1 is a first example embodiment of a magazine turret attachment according to the present invention.

An inventive magazine turret attachment M for being used in a portioning machine as shown in FIGS. 1 to 4 comprises a turret base 100 and a chute module 200.

The turret base 100 is essentially cylindrical or is shaped as a circular disc and has a rotation axis or central axis A about which the turret base 100 may turn. The turret base 100 comprises a disc-shaped base segment 110, and an equally disc-shaped turret segment 120 which are oriented coaxially with respect to each other.

The base segment 110 and the turret segment 120 have each a first chute 112 extending through the turret base 100, i. e. through the base segment 110 and the turret segment 120 and consisting of two chute portions, the one chute portion being provided in the base segment 110 and the other chute portion being provided in the turret segment 120. The chute axes of these two chute portions are oriented coaxially to each other and parallel to the rotation axis A of the turret base 100 (cf. FIGS. 2, 4). The chute portions of the first chute have an at least approximately identical, oval cross-section which is adapted to the strand-like product and form the continuous chute 112 with the chute axis B formed in the turret base 100.

Figure 2:
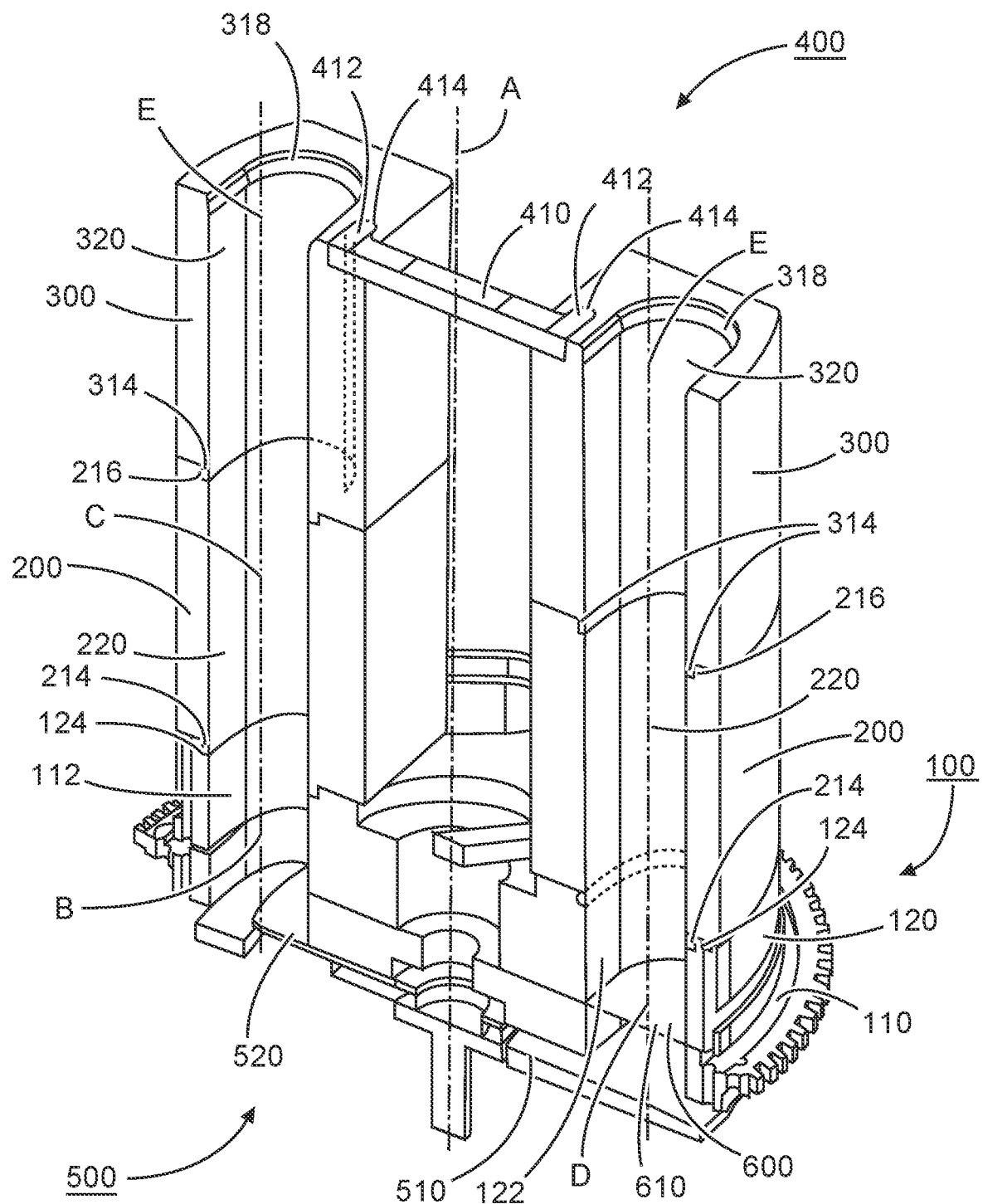
FIG. 2 is a sectional view of the magazine turret attachment of FIG. 1.
Figure 4:
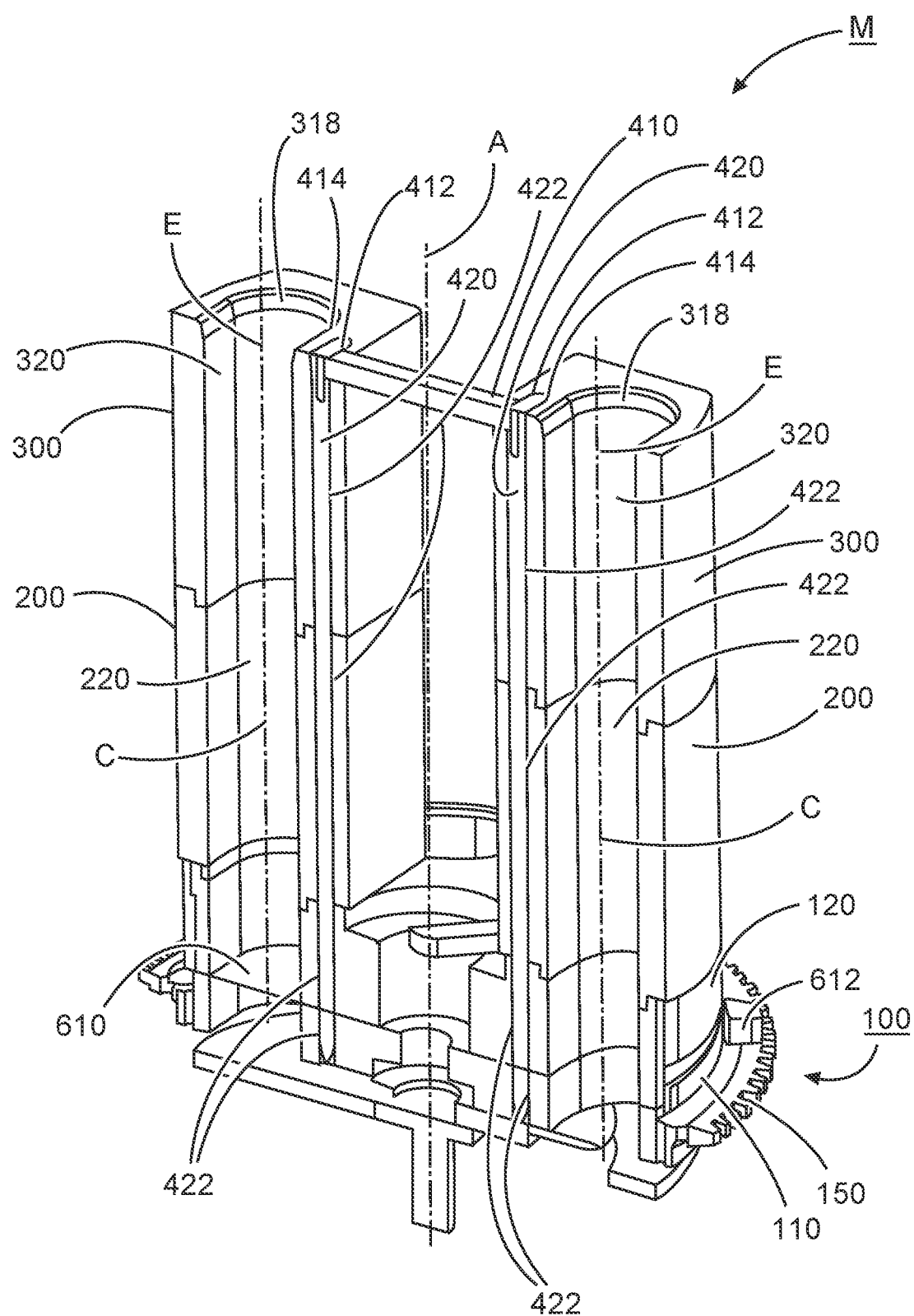
FIG. 4 is a sectional view of the magazine turret attachment of FIG. 3.

The base segment 110 and the turret segment 120 have each a second chute 122 extending through the turret base 100 and consisting, in turn, of a first chute portion provided in the base segment 110 and a second chute portion provided in the turret segment 120, which second chute extends through the base segment 110 and through the turret segment 120 and the chute axis D of which is aligned parallel to the rotation axis A of the turret base 100 (cf. FIGS. 2, 4). In other words, the axes of the two chute portions of the second chute 122 are aligned coaxially with each other. The two chute portions of the second chute 122 have, in turn, an at least approximately identical, oval cross-sectional shape.

The chutes 112, 122 are arranged opposite each other, regarding the rotation axis or central axis A.

Two or more chutes may be provided in the turret base. According to the embodiment of FIGS. 1 and 2, six chutes are arranged in the turret base 100 along the circumference of the turret base 100 in such a manner that every two chutes form a respective pair and are arranged opposite to each other with respect to the central axis A. The pairs of chutes located opposite to each other have identical cross-sections. In other words, the chutes have identical pairs of cross-sections; however, the cross-sections of the individual pairs of chutes may differ from one another, such that in the embodiments of FIGS. 1 and 2, all in all, three pairs of chutes having different cross-sections may be provided. Obviously, it is also possible that all chutes of the turret base 100 have identical cross-sections.

The magazine turret attachment M according to the invention further comprises a first chute module 200 which, according to FIGS. 1 to 4, is placed in a reversibly removable manner onto the first chute 112 of the turret base 100. The first chute module 200 has a single, continuous chute 220 having a chute axis C. The cross-section of the chute 220 of the first chute module 200 and the cross-section of the first chute 112 in the turret base 100 are identical. The first chute 112 in the turret base 100 and the chute 220 of the first chute module 200 are oriented coaxially with each other, such that their cross-sections lie congruently above each other.

A further first chute module 200 having a chute axis C is placed in a reversibly removable manner onto the second chute 122 of the turret base 100 and is oriented coaxially therewith.

Each of the first chute modules 200 has an essentially cuboidal outer shape, with the surfaces of the chute modules 200 facing away from the central axis A having an arching which corresponds to the curvature of the circumference of the turret base 100.

In order to make it possible to place a chute module 200 in a positionally accurate manner onto the turret base 100, first connecting portions 124 and first counter-connecting portions 214 are provided. A first connecting portion is arranged on the side of the turret base 100 which faces towards the chute module 200 when the first chute module 200 is slid into position, i. e. on the upwardly facing side, as shown in FIGS. 1 and 2. Furthermore, a first counter-connecting portion 214 is provided on the side of the first chute module 200 which faces towards the turret base 100 when the first chute module 200 is slid onto the turret base, i. e. on the downwardly facing side of the first chute module 200. The first connecting portion 124 and the first counter-connecting portions 214 enable a positive connection and/or a nonpositive connection of the chute module 200 with the turret segment 120.

The chute module 200 has a shape which is different from a rotationally symmetrical disc shape and is positioned eccentrically with respect to the central axis or rotation axis A of the turret base 100. Thus the chute axis of the chute module 200, which is represented merely in a dot-dash line, is located eccentrically with respect to the central axis or rotation axis R. FIG. 1 shows that the chute module 200 is columnar or pillar-like and extends parallel to the central axis or rotation axis R of the turret base 100 and upwards therefrom. Typically, the chute modules 200 are vertically oriented. The chute 220 formed in the chute module 200 is associated with only one respective chute 112 of the turret base 100. This makes it possible to react in a flexible manner to changes in the cross-section of the strand of foodstuff in that only one single chute module 200 needs to be exchanged.

According to FIG. 2, the turret base 100 has a first connecting portion 124 in the form of a recess extending circumferentially about the upper end of the first chute 112. The first counter-connecting portion 214 of the chute 200 corresponding thereto is configured as a circumferential projection formed on the end of the chute 220 of the chute module 200 which faces towards the turret base 100.

On the end of its chute 220 facing away from the turret base 100, the chute module 200 has a further connecting portion 216, shaped in the form of a circumferential recess which corresponds, as to its configuration, to the first connecting portion 124 of the turret base 100.

As can further be seen from FIGS. 1 and 2, the first chute modules 200 have second chute modules 300 slid thereon in a reversibly removable manner for forming a reception chute.

Each of the second chute modules 300 has one single chute 320 having a chute axis E and extending through the second chute module 300. The first chute module 200 and the second chute module 300 are aligned coaxially with respect to each other, such that their chutes 220, 320, which have identical cross-sections, are congruently in alignment.

Every second chute module 300 has a connecting portion 314 formed on the end of its chute 320 which faces towards the chute module 200 and corresponding to the connecting portion 214 of the chute module 200 and by means of which the second chute module 300 may be connected to the first chute module 200 in a positive and/or nonpositive manner, such that the chute 220, 320 are oriented in alignment with each other.

The second chute module 300 is, according to the example embodiment of FIGS. 1 and 2, configured as an end portion of the reception chute for the strand-like product. Therefore the end of the chute module 300 facing away from the turret base 100 has no connecting portion but is provided with a chamfer or insertion bevel 318 for easier insertion of the strand-like product into the chute 320.

A locking device 400 is provided for stabilising the reception chutes. The locking device 400 comprises an approximately rod-shaped locking element 410 having connecting portions 412 arranged on its ends. Furthermore, each of the second chute modules 300 is provided, on its upper end, with a locking recess 414 facing in the direction of the central axis A In order to fasten the upper ends of the reception chutes in their distance relative to each other and in order to stabilise the reception chutes, the locking element 410, with its respective connecting portions 412, is inserted into the corresponding locking recesses 414 of the second chute modules 300 wherein the connecting portions 412 are received in a positive and/or nonpositive manner. In conjunction with the locking device 400, the chute modules 200, 300 form essentially a bridge construction on the turret base 100.

The at least one further chute module 300, which is equally associated with only exactly one chute 112 in the turret base 100, can remain in place when the first chute module 200 is exchanged, disassembled, or the like. A further advantage of the chute modules 200, 300 according to the invention consists in their reduced weight. Instead of having a cross-sectional shape essentially identical to that of the turret base 100, which has a round disc shape, the shape of the chute module 200, 300, when considered in top view or in cross-section, is only a segment of said disc shape. This makes it possible to achieve considerable material savings as compared to a rotationally symmetrical disc shape. The magazine turret attachment M according to the invention may therefore be adapted more rapidly, in an easier manner and with less expenditure of physical effort to the strand-like product P to be processed. Due to the lighter weight, the handling of the chute modules 200, 300, when they need to be exchanged for adapting to a change in the cross-section of the strand of foodstuff and/or for cleaning purposes, is greatly simplified.

Figure 3:
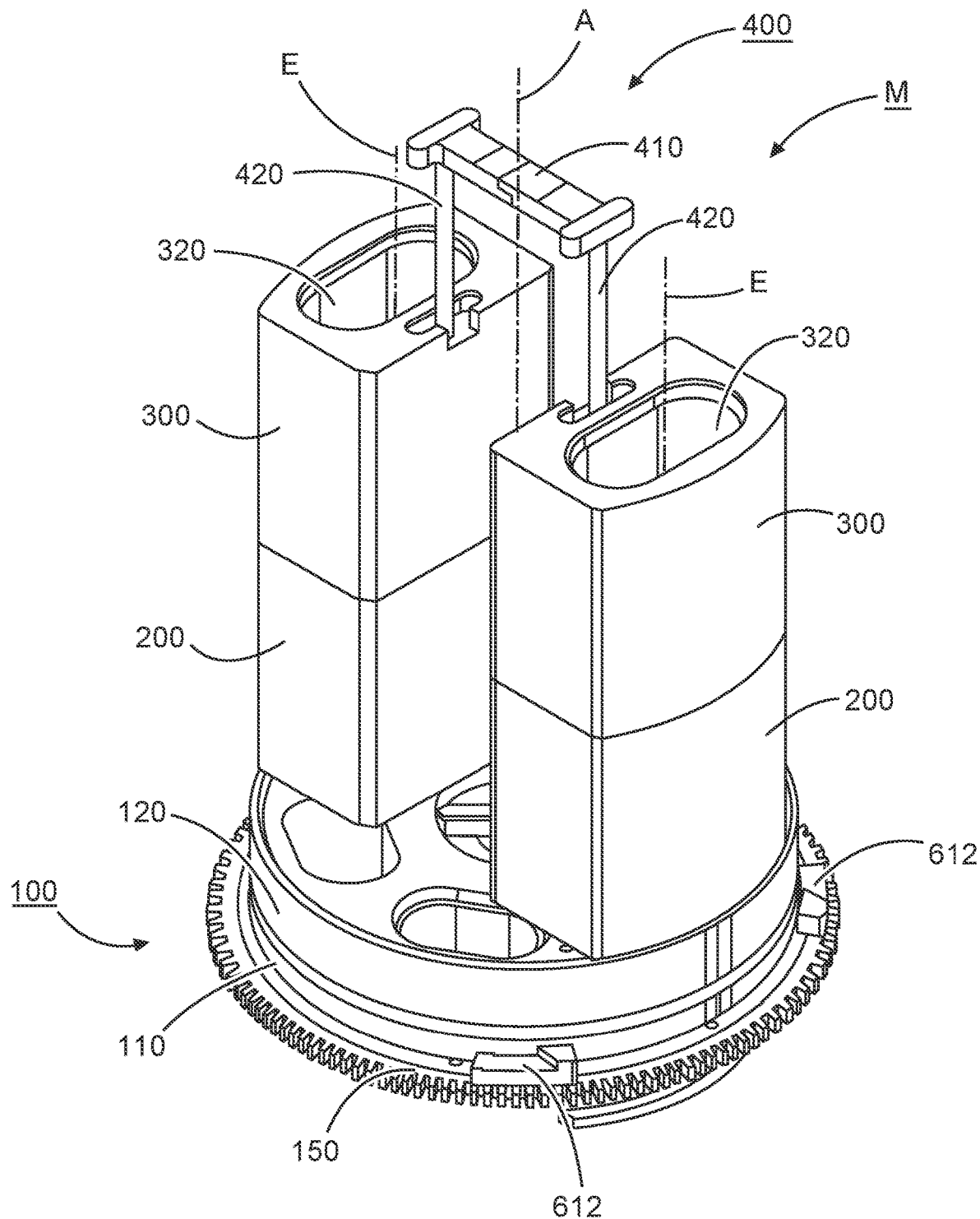
FIG. 3 is a second example embodiment of a magazine turret attachment according to the present invention.

The second example embodiment of the inventive magazine turret attachment M which is illustrated in FIGS. 3 and 4 is largely identical to the first example embodiment of the inventive magazine turret attachment M as illustrated in FIGS. 1 and 2.

The magazine turret attachment M of FIGS. 3 and 4 differs from the first example embodiment in the locking device 400. According to FIGS. 3 and 4, the locking device 400 of the second example embodiment, like the locking device 400 of the first example embodiment, comprises a locking recess 414 formed on the upper ends of the second chute modules 300 and facing in the direction of the central axis A as well as an approximately rod-shaped locking element 410 having connecting portions 412 arranged on its ends and capable of entering in engagement with the locking recess 414. In addition, the chute modules 200, 300 have vertical drill holes 422 provided therein formed in the area of their sides facing towards the central axis A and extending parallel to the axes C, E of the chute modules 200, 300. Furthermore, the base segment 110 and the turret segment 120 of the turret base 100 have equally drill holes 422 formed therein which are in alignment with the drill holes 422 formed in the chute modules 200, 300.

Locking bolts 420 are connected, at their upper ends, to the ends 412 of the locking element 410 in such a manner that the latter may be inserted into the drill holes 422 of the turret base 100 and of the chute modules 200, 300. The length of the bolts 420 corresponds approximately to the height of the magazine turret attachment M, that is, to the sum of the heights of the turret base 100 and of the chute modules 200, 300.

It is to be understood that the various different connecting and locking possibilities, that is, the connecting portions 124, 214, 216 for connecting the chute modules 200, 300 to the turret base 100, which are equally shown in FIGS. 3 and 4, the locking element 410 as well as the locking bolts 420 may be provided separately or in any particular combinations in order to connect the chute modules 200, 300 to the turret base 100 and to secure them thereon. It is also possible, for example, to provide the locking bolts 420 separately, that is, without the locking element 410.

The length of the locking bolts 420 may also be adapted to the exact height of the magazine turret attachment M by selecting bolts having a corresponding length. In addition, the locking bolts may be simply slid into the chute modules 200, 300 and into the turret base 100. However, it is also possible for the locking bolts to be provided with screw threads, formed at least on their free lower ends, and for the drill holes 422 in the turret base 100 to be equally provided with corresponding screw threads, thus enabling the locking bolts 422 to be screwed into the turret base 100. Furthermore, instead of a threaded connection, another type of detachable connection, such as a snap-in connection, may be provided.

In order to rotatorily drive the magazine turret attachment M about its central axis A, a drive element 150 in the form of a circumferential toothing is provided on the outer circumference of the base segment 110 of the turret base 100, forming part of a drive unit that is not otherwise specified. A further drive element, not shown, such as a toothed wheel which may be driven by a correspondingly suitable drive mechanism, such as an electric motor, enters in engagement with the drive element, or toothing, 150.

This drive unit may be used to transfer a reception chute from a filling position to a cutting position. In FIGS. 1 and 2, the respective right-hand reception chutes are in the filling position and the respective left-hand reception chutes are in the cutting position.

In order to be in a position to cut a strand-like product which is present in the reception chute into individual portions, i. e. into slices of preferably equal thickness or equal weight, a portioning and cutting device 500 is arranged below the magazine turret attachment M.

The portioning and cutting device 500 comprises a portioning disc 510 which is arranged below the base segment 110 and is parallel thereto. The distance between the top of the portioning disc 510 and the bottom of the base segment 110 corresponds to the desired thickness of the individual portion and may be set by shifting the portioning disc 510 along the central axis A. In the area of the cutting position, the portioning disc 510 has an opening through which the individual portion which has been separated from the strand-like product may be evacuated downwards, for example, in order to be placed onto, and carried away by, a corresponding transporting element.

The portioning and cutting device 500 further comprises a cutting device including a cutter blade 520. The cutter blade 520 is configured as a rotary blade and is arranged at the bottom of the base segment 110 in such a manner that it may be rotatorily driven about the central axis A. The cutter blade 520, upon a rotation of 360° about the central axis A, separates a portion of the strand-like product protruding from the lower end of the reception chute and extending down to the portioning disc 510 from the remaining strand.

As can further be seen in particular from FIGS. 2 and 4, an essentially planar separating element 610 of a separating unit 600 is arranged between the base segment 110 and the turret segment 120. The separating element 610 is configured as an approximately circular, planar element, such that the reception chute, or more precisely speaking, the chute 122 formed in the turret base 100 between the base segment 110 and the turret segment 120, is interrupted. The separating element 610 has a clearance formed in the area of the cutting position, such that in this position, a continuous chute 112 for the strand-like product will be remain intact. The chute 112 may be provided as a permanently unobstructed chute. It is also possible, however, to provide a slide element covering the clearance formed in the separating element 610 at least temporarily, such that the chute 112 is equally interrupted, at least temporarily, by the slide element.

An engaging element 612 is provided on the separating element 610 in order to ensure that the separating element 610 with its clearance is secured in the cutting position while the magazine turret attachment M is rotated about the central axis A in order to move a reception chute, together with a strand-like product received therein, from the filling position to the cutting position (cf. FIG. 1). The engaging element 612 is engaged with a corresponding counter-engaging element, not shown, which is stationarily connected to a frame element of the portioning machine.

In order to cut a strand-like product into portions or slices of preferably equal thickness or equal weight, the distance between the portioning disc 510 and the base segment 110 is set so as to correspond to the desired thickness of the slice.

Depending on the length of the strand-like product to be cut, one single chute module 200 or a given number of chute modules 200 are connected first to the corresponding connecting portion 124 of the turret base 100 and are interconnected with the other connecting portion 216 of the other chute modules 200 by means of the counter-connecting portions 214 in order to form the reception chute. Subsequently a second chute module 300 is slid onto the uppermost chute module 200. If two reception chutes are formed, as shown in FIGS. 1 and 2, these are stabilised by attaching a locking element 410 to the upper ends of the two chute modules 300.

Once the chutes have been prepared, first a strand-like product is inserted into the reception chute located in the filling position, i. e. into the right-hand reception chute, as shown in FIGS. 1 and 2, in order to create individual portions. The separating element 610 prevents the strand-like product from exiting at the bottom end of the reception chute and from entering into contact with the portioning disc 510.

By rotating the magazine turret attachment M about the central axis A by 180°, the filled reception chute is transferred from the filling position to the cutting position, i. e. to the left-hand position, as shown in FIGS. 1 and 2. During this operation, the strand-like product placed on the separating element 610 will slip down from the filling position to the cutting position.

When in the cutting position, the strand-like product placed in the reception chute may slip further down in the direction of the portioning and cutting device 500, until it is in abutment with the portioning disc 510. Subsequently, the portion of the strand-like product which protrudes from the bottom end of the base segment 110, and which has the desired portion size, will be cut off by rotating the cutter blade 510 about the central axis A by 360°. The individual portion then falls down through the clearance formed in the portioning disc 510 and onto a transporting element arranged therebelow, and will then be carried out of, and away from, the portioning machine.

As explained further above, for building a reception chute having a desired length, a chute module 200 is first slid onto the turret segment 120. The reception chute may be further extended by adding further chute modules 200 as well as a terminal module or second chute module 300. Obviously, a reception chute may comprise exactly one first chute module 200 and one second chute module 300, as shown in FIGS. 1 to 4. However, a reception chute may also be formed by merely one second chute module 300.

The chute modules 200, 300 may be of equal lengths, as can be seen in FIGS. 1 to 4. However, chute modules 200 of various different lengths may also be provided in order to achieve a more precise adaptation of the length of the reception chute to the length of the strand-like product. In addition, it is also possible for the second chute module 300 to be of such a short length that it may simply serve as a terminal element and/or stabilising element of the reception chute and that its length is irrelevant to the overall length of the reception chute.

In connection with FIGS. 1 and 2, the connecting portions and counter-connecting portions formed on the turret segment and on the chute modules have been described as recesses and projections extending circumferentially about the ends of the chutes. However, it is also possible to provide other elements as connecting portions. Drill holes or other recesses may, for example, be provided in the end faces of the chute modules or in the top surface of the turret element and may be engaged with by corresponding bolts or by projections corresponding to said recesses.

In order to ensure safe retention between the turret segment and the chute modules, further engagement elements and counter-engagement elements may be provided on the connecting portions or on the turret segment or the chute modules in order to achieve a nonpositive connection. In the most simple case, these may be realised by protuberances or indentations, formed, for example, on the radial surfaces of said recesses and projections. In the first case a nonpositive and a positive connection is realised in one element, in the second case the functions of nonpositive engagement and positive engagement are realised on separate elements.

The example embodiments of FIGS. 1 to 4 show a two-part embodiment of the turret base, including a base segment and a turret segment. An embodiment of this type is advantageous in a case in which a separating element needs to be provided between the base segment and the turret segment. In a case in which such a separating element is not required, the turret base may obviously be integrally formed as a one-piece embodiment, such that it comprises merely a single disc-shaped element on the outer circumference of which the drive element of the drive unit is arranged in order to be able to rotatorily drive the one-piece turret base about its central axis.

REFERENCE SIGNS

A central axis
B chute axis
C chute axis
D chute axis
E chute axis
P portioning machine
100 turret base
110 base segment
112 first chute
120 turret segment
122 second chute
124 first connecting portion
150 toothing
200 first chute module
214 first counter-connecting portion
216 connecting portion
220 chute
300 second chute module
314 connecting portion
318 insertion bevel
320 chute
400 locking device
410 locking element
412 connecting portion
414 locking recess
500 portioning and cutting device
510 portioning disc
520 cutter blade
600 separating unit
610 separating element
612 engaging element

The invention claimed is:

1. A magazine turret attachment for a portioning machine for dividing a strand-like product into individual portions, said magazine turret attachment including:
    a turret base rotatable about a rotation axis which has at least one first chute extending through the turret base and the chute axis of which is at least approximately parallel to the rotation axis of the turret base; and
    at least one first chute module which may be reversibly arranged on the turret base in the area of the first chute and which is provided with only one chute extending through said first chute module and the chute axis of which extends coaxially to the chute axis of the first chute of the turret base and the cross-section of which corresponds at least approximately to the cross-section of the at least one chute of the turret base in order to form a first reception chute for a strand-like product.

2. The magazine turret attachment as claimed in claim 1, wherein the turret base has at least one second chute extending through the turret base and the chute axis of which is at least approximately parallel to the rotation axis of the turret base.

3. The magazine turret attachment as claimed in claim 2, wherein a first chute module for forming a second reception chute for the strand-like product is reversibly arrangeable on the turret base in the area of the second chute.

4. The magazine turret attachment as claimed in claim 1, wherein several first and second chutes are arranged in the turret base.

5. The magazine turret attachment as claimed in claim 4, wherein the first chutes and second chutes are realised as pairs having identical cross-sections.

6. The magazine turret attachment as claimed in claim 1, wherein the turret base, in the area of the first chute, on its side which faces towards the first chute module when the first chute module is arranged on the turret base, has at least one connecting portion, and wherein the at least one first chute module, on its side which faces towards the turret base when the first chute module is arranged on the turret base, has at least one first counter-connecting portion, the first connecting portion of the turret base and the first counter-connecting portion of the first chute module may enable a positive connection and/or a nonpositive connection of the chute module with the turret base for forming a reception chute for the essentially strand-like product.

7. The magazine turret attachment as claimed in claim 6, wherein the first connecting portion of the turret base is a recess extending circumferentially about the first chute of the turret base, whereas the first counter-connecting portion of the first chute module is a projection corresponding to the recess formed in the turret base and extending circumferentially about the chute of the first chute module.

8. The magazine turret attachment as claimed in claim 6, wherein the first chute module, on its side facing away from the turret base when the first chute module is arranged on the turret base, has at least one second connecting portion.

9. The magazine turret attachment as claimed in claim 8, wherein the first connecting portion of the turret base and the second connecting portion of the first chute module are identically configured.

10. The magazine turret attachment as claimed in claim 1, wherein a second chute module is provided which may be reversibly arranged on the first chute module or on the turret base and which has a chute extending through the second chute module the chute axis of which extends coaxially to the chute axis of the first chute module and/or to the axes of the first or second chutes of the turret base and the cross-section of which at least approximately corresponds to the cross-section of the chute of the first and/or second chute module, the second chute module having a locking recess formed on its side facing away from the first chute module when the second chute module is arranged on the first chute module.

11. The magazine turret attachment as claimed in claim 10, wherein an essentially rod-shaped locking element is provided which has connecting portions formed on its ends and corresponding to the locking recesses of the second chute modules.

12. The magazine turret attachment as claimed in claim 1, wherein the turret base has a base segment and a turret segment which are interconnected in such a manner that they may concurrently be rotatorily driven about their common central axis.

13. The magazine turret attachment as claimed in claim 12, wherein an essentially planar separating unit is arranged between the base segment and the turret segment of the turret base.

14. The magazine turret attachment as claimed in claim 13, wherein the essentially planar separating unit is a metal sheet provided with at least one clearance arranged in the area of a chute portion of the turret base.

15. A portioning machine for dividing a preferably strand-like product into individual portions, comprising
the magazine turret attachment as claimed in claim 1, and
a portioning and cutting device arranged in the area of the turret base for separating an individual portion from the strand-like product prepared and held ready within the magazine turret attachment.

\* \* \* \* \*